May 14, 1935. G. HOLDERBACH 2,001,136
REMOVABLE WALL LINING
Filed July 30, 1934
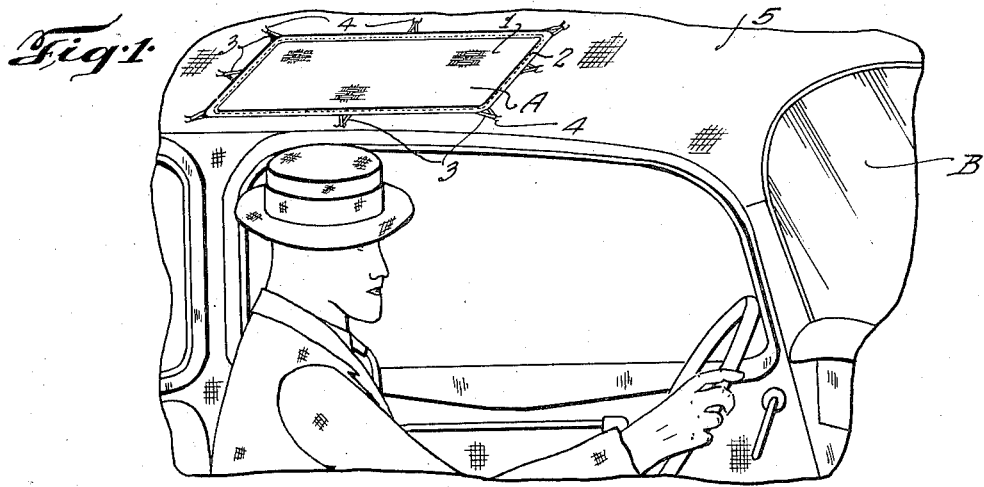
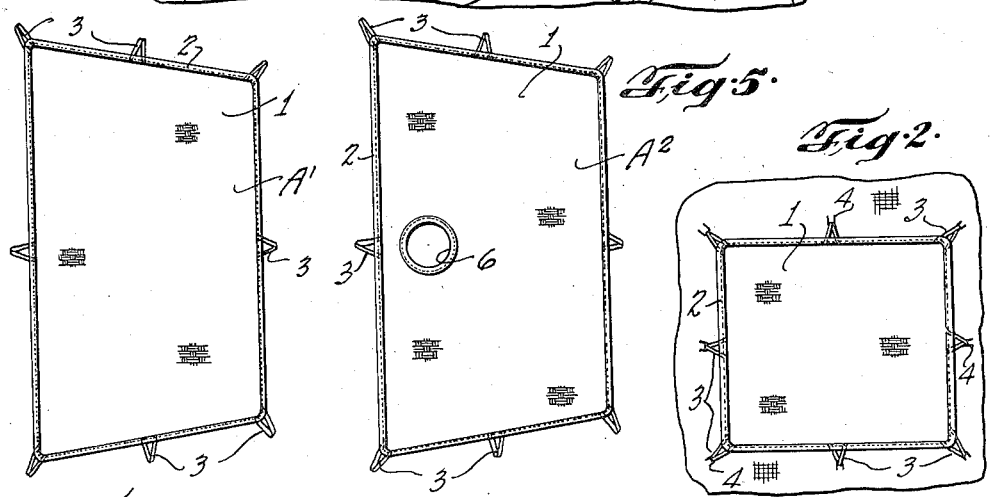
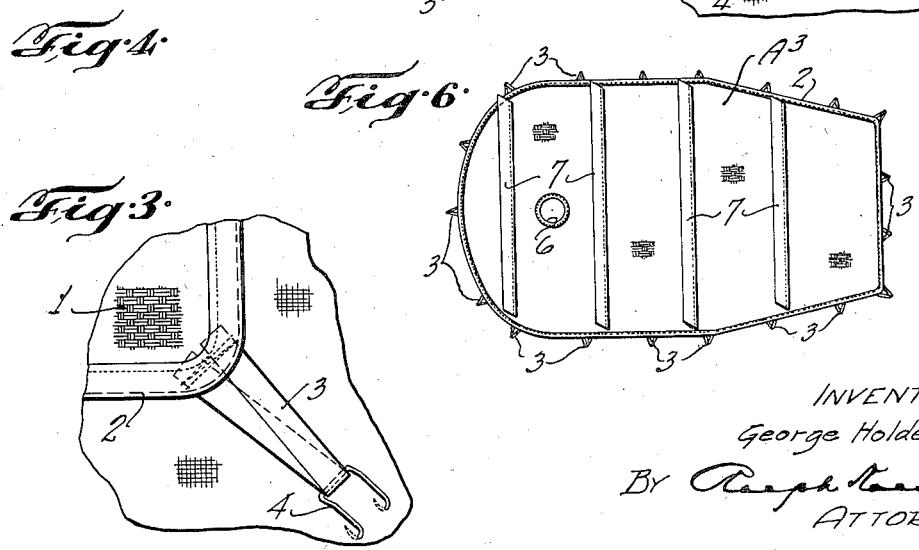
INVENTOR
George Holderbach.
By
ATTORNEY Patented May 14, 1935

2,001,136

UNITED STATES PATENT OFFICE 2,001,136

REMOVABLE WALL-LINING

George Holderbach, St. Louis, Mo., assignor to Evr-Klean Seat Pad Company, St. Louis, Mo., a corporation of Missouri Application July 30, 1934, Serial No. 737,624

4 Claims. (Cl. 45—138)

This invention relates generally to removable wall-linings and, more particularly, to a certain new and useful improvement in linings especially adapted for detachable mounting upon the walls of an automobile or the like, my invention having for its chief object the provision, as a new article of manufacture, of a lining in the form of a section of matting, fabric, or other suitable material which may, for cleanliness, be readily and conveniently detachably disposed as an overlying, auxiliary, or supplemental covering upon the fixed lining of the wall of an automobile-body or the like.

And with the above and other objects in view, my invention resides in the novel features of form, construction, arrangement, and combination of parts presently described and pointed out in the claims.

In the accompanying drawing,—

Figure 1 illustrates in fragmental perspective an automobile equipped with a detachable wall-lining of my invention;

Figure 2 is a reduced plan view of the wall-lining or covering of Figure 1;

Figure 3 is an enlarged fragmental view of the wall-lining of Figure 1; and

Figures 4, 5, and 6 are plan views of other selective forms or shapes of the wall-lining.

Referring now more in detail and by reference characters to the drawing, which illustrates practical embodiments of my invention, A designates the lining, which includes a body-member 1 constructed of matting, fabric, or other suitable preferably flexible material. Preferably also, but not essentially, the body-member 1 is of such material that may with more or less convenience be washed or cleaned, and neatly finishing the margin of the member 1, is a suitable binding 2.

Suitably stitched or otherwise permanently attached to the member 1 in spaced relation along and substantially throughout the length of the binding 2, is a series of elastic or resilient loops 3, each equipped with a suitable preferably double or U-shaped hook 4.

In use and practice, the lining A is disposed flatwise over and upon the particular wall, or a corresponding portion of the particular wall, as the top-wall 5, of the automobile-body B and readily detachably secured tautly thereupon by means of engagement of the hooks 4 with the usual cloth or other penetrable permanent wall-covering, as illustrated in Figures 1 and 3.

Preferably the lining A is of such reduced dimensions and form for overlying merely a portion of the wall 5, as, for instance, that portion of the wall disposed over the front or driver's seat, so as to merely protect the headwear of the driver from soiling under accidental engagement thereof with the usually more or less dusty fixed wall-lining, as illustrated in Figure 1. Accordingly, the lining A is preferably of rectangular contour and disposed on wall 5, as shown in Figure 1. However, the lining may, if desired, be of various shapes, contours, and sizes to fit differently contoured, or different or larger portions of the wall of the automobile-body. For instance, the lining A' is of trapezoidal contour for attachment to the wall 5 over the front seat of an automobile-body of coach or sedan type; the lining $A^2$ is of like contour for attachment to the wall 5 over the rear seat of a coach or sedan, the lining $A^2$ being suitably equipped with a dome-light accommodating-opening, as at 6; while the lining $A^3$ is of size and contour for overlying the entire top wall of an automobile-body and is similarly equipped with a dome-light opening 6, the lining $A^3$ being preferably also equipped with a plurality of suitably spaced transverse flexible strips or the like 7 having one lengthwise margin free for suitable engagement or connection with the fixed lining of the wall 5 for preventing intermediate sagging of the covering-lining A.

In each instance, the lining may be inexpensively constructed, may be conveniently attached upon and detached from the body-wall, and is efficient in the performance of its intended functions.

And it is to be understood that changes in the form, construction, arrangement, and combination of the several parts of the lining may be made and substituted for those herein shown and described without departing from the nature and principle of my invention.

Having thus described my invention, what I claim and desire to secure by Letters Patent is,—

1. As a new article of manufacture, a covering or lining including a body-member, elastic strips endwise fixed to, and disposed in spaced relation along, the margin of the body-member, and hooks carried by said strips for detachably securing the body-member flatwise to and upon a wall or the like.

2. As a new article of manufacture, a covering or lining including a body-member, elastic loops disposed in spaced relation along the margin of the body-member, and hooks carried by said loops for engagement with a wall or the like for detachably securing the body-member flatwise thereupon.

3. As a new article of manufacture, a covering including a section of flexible matting, elastic loops fixed in spaced relation along the margin of said section, and hooks carried by said loops for engagement with a wall or the like for detachably securing the section flatwise tautly thereupon.

4. As a new article of manufacture, a covering including a section of flexible matting, and means for detachably securing the section flatwise upon a wall or the like, said means including spaced flexible strips fixed at a margin to, and extending crosswise over, the section.

GEORGE HOLDERBACH.